United States Patent
Gutierrez et al.

(10) Patent No.: US 8,647,395 B2
(45) Date of Patent: Feb. 11, 2014

(54) SURFACTANT PACKAGE AND WATER IN HYDROCARBON EMULSION USING SAME

(75) Inventors: Xiomara Gutierrez, Caracas (VE); Hercilio Rivas, Caracas (VE); Migdalia Carrasquero, Caracas (VE); Luis Marcano, Los Teques (VE)

(73) Assignee: Intevep, S.A., Caracas (VE)

( * ) Notice: Subject to any disclaimer, the term of this patent is extended or adjusted under 35 U.S.C. 154(b) by 0 days.

(21) Appl. No.: 12/870,503

(22) Filed: Aug. 27, 2010

(65) Prior Publication Data

US 2011/0209385 A1    Sep. 1, 2011

Related U.S. Application Data

(63) Continuation of application No. 10/439,486, filed on May 16, 2003, now abandoned.

(51) Int. Cl.
*C10L 1/32* (2006.01)
*C10L 1/18* (2006.01)
*C10L 1/22* (2006.01)

(52) U.S. Cl.
USPC ............ 44/301; 44/302; 44/385; 44/408; 44/411; 44/451

(58) Field of Classification Search
USPC ............ 44/301, 302, 385, 408, 411, 451
See application file for complete search history.

(56) References Cited

U.S. PATENT DOCUMENTS

| | | | |
|---|---|---|---|
| 3,346,494 A * | 10/1967 | Robbins et al. | 508/180 |
| 4,083,698 A | 4/1978 | Wenzel et al. | |
| 4,451,265 A | 5/1984 | Schwab et al. | |
| 4,451,267 A | 5/1984 | Schwab et al. | |
| 5,004,479 A | 4/1991 | Schon et al. | |
| 6,017,368 A | 1/2000 | Steinman | |
| 6,245,723 B1 | 6/2001 | Sigg et al. | |
| 6,348,074 B2 | 2/2002 | Wenzel | |
| 6,858,046 B2 | 2/2005 | Daly et al. | |

FOREIGN PATENT DOCUMENTS

WO    9935215    7/1999

* cited by examiner

*Primary Examiner* — Cephia D Toomer
(74) *Attorney, Agent, or Firm* — Bachman & LaPointe, P.C.

(57) ABSTRACT

A surfactant package for a water-in-hydrocarbon emulsion includes a fatty acid component; a fatty acid salt component; an alcohol component and a salt of carboxylic acid. Emulsions formed using this surfactant package are stable and have ratios of water to surfactant of at least about 3.

19 Claims, 1 Drawing Sheet

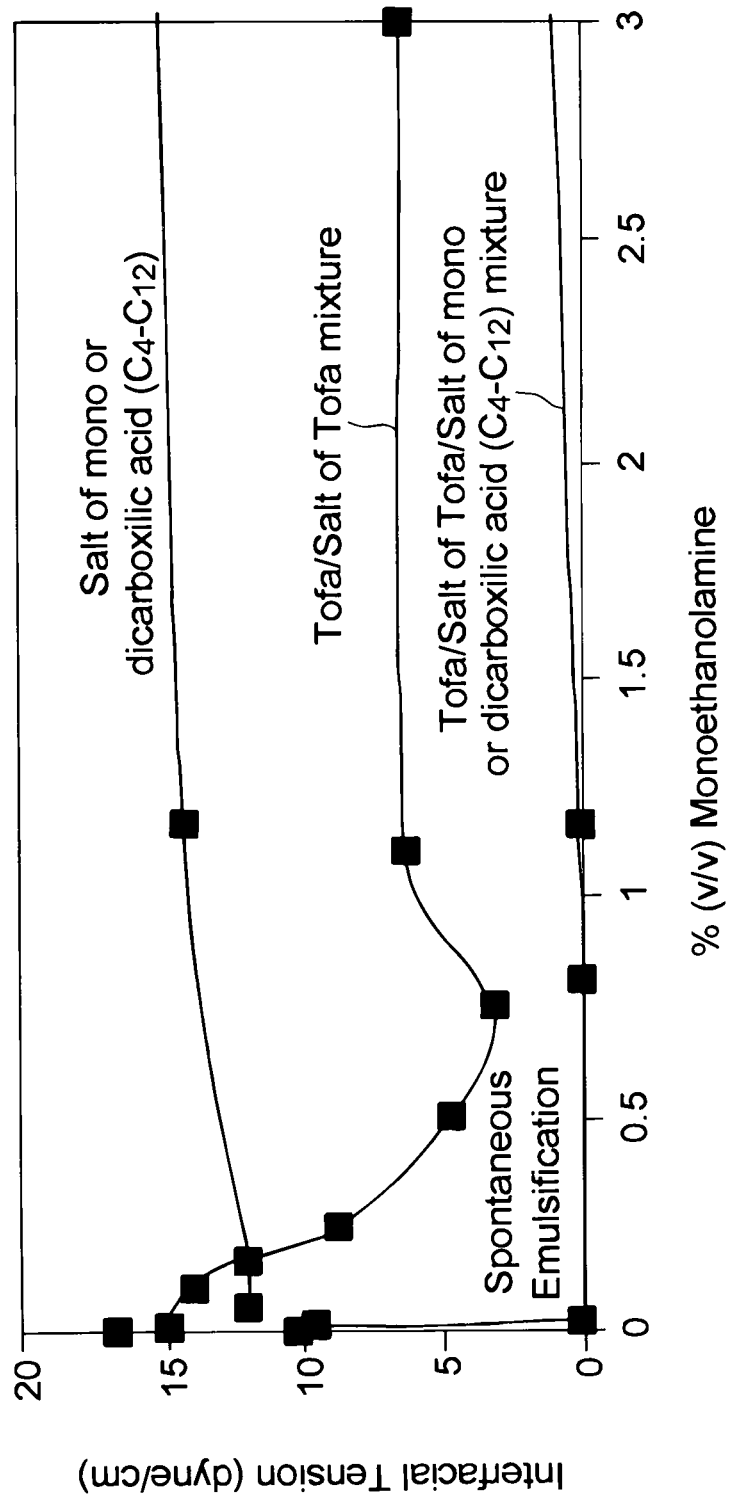

SURFACTANT PACKAGE AND WATER IN HYDROCARBON EMULSION USING SAME

CROSS REFERENCE TO RELATED APPLICATIONS

This application is the U.S. Continuation Application of U.S. application Ser. No. 10/439,486 filed May 16, 2003, now abandoned.

BACKGROUND OF THE INVENTION

The invention relates to a surfactant package and a water-in-hydrocarbon emulsion using same.

The incorporation of water into hydrocarbons is useful for various purposes including the provision of fuels having desirable properties.

Attempts to provide water-in-hydrocarbon emulsions have met with very serious technical and economic problems due to short-term stability of emulsions formed having droplet sizes in the macroemulsion range, and further due to the large quantities of surfactants and cosolvents required to form emulsions having droplet sizes in the microemulsion range.

For example, U.S. Pat. Nos. 4,568,354 and 4,568,355 to Davis et al. are drawn to processes for converting a hazy or potentially hazy water saturated alcohol-gasoline mixture into a clear stable gasoline composition having an improved octane rating. The system so produced has a water content of no more than 1% by volume, and relatively large volumes of non-ionic surfactant are used to produce this system.

Similarly, U.S. Pat. Nos. 4,770,670 and 4,744,796 to Hazbun et al. also disclose the formation of stable microemulsions which contain large amounts of surfactant as compared to the water content.

Other efforts in this area include U.S. Pat. No. 5,104,418, WO 99/35215, U.S. Pat. No. Re. 35,237, U.S. Pat. No. 5,743,922, WO 97/34969, U.S. Pat. No. 5,873,916 and WO 99/13031.

In spite of the disclosures in the a foregoing patents, the need remains for a water-in-hydrocarbon emulsion which is stable and which contains a desirable amount of water without the need for relatively large amounts of surfactant and/or other stabilizing agents.

It is therefore the primary object of the present invention to provide water-in-hydrocarbon emulsions which are both stable and formed using relatively small amounts of surfactant.

It is a further object of the present invention to provide a surfactant package which is useful for providing such water-in-hydrocarbon emulsions.

Other objects and advantages of the present invention will be readily apparent from a consideration of the following.

SUMMARY OF THE INVENTION

In accordance with the present invention, the foregoing objects and advantages have been readily attained.

In accordance with the invention, a surfactant package for a water-in-hydrocarbon emulsion is provided which comprises a fatty acid component; a fatty acid salt component; an alcohol component and a salt of carboxylic acid.

In further accordance with the invention, a water-in-hydrocarbon emulsion is provided, which comprises a water phase; a hydrocarbon phase; and a surfactant package, wherein said surfactant package comprises a fatty acid component; a fatty acid salt component; an alcohol component and a salt of carboxylic acid.

In accordance with the present invention, it is found that the carboxylic acid salt component added to the surfactant package allows drastic reduction in the amount of surfactant needed to form a stable microemulsion as compared to the amount of surfactant needed without the carboxylic acid salt component.

The alcohol component is advantageously a $C_4$-$C_8$ alcohol.

BRIEF DESCRIPTION OF THE DRAWING

A detailed description of preferred embodiments of the present invention follows, with reference to the attached drawings, wherein:

FIG. 1 schematically illustrates interfacial tension versus concentration of individual components of the surfactant package as well as the combined surfactant package in accordance with the present invention.

DETAILED DESCRIPTION

The invention relates to a surfactant package and a water-in-hydrocarbon emulsion using same. The emulsion is stable and can advantageously be formed using very small amounts of surfactant. Such an emulsion is useful, for example, as a combustible fuel, for example for compression ignition engines and the like. The emulsion has beneficial characteristics as a fuel including reduced emissions. Emulsions in accordance with the present invention include stable microemulsions which include a dispersed water phase and a continuous hydrocarbon phase as well as an advantageous surfactant package which, as will be discussed below, includes a combination of components which advantageously reduce the amount of surfactant needed to form the stable emulsion.

Suitable hydrocarbons for use in making emulsions of the present invention include petroleum hydrocarbons and natural gas derived products, examples of which include Diesel fuel and other low gravity hydrocarbons such as Fischer-Tropsch synthetic Diesel and paraffins $C_{10}$ to $C_{20}$.

Emulsions including this hydrocarbon in accordance with the present invention have reduced $NO_x$ emissions and C emissions, and improved opacity as compared to the hydrocarbon alone. One example of a suitable hydrocarbon is a Diesel fuel characterized as follows:

TABLE 1

| | | |
|---|---|---|
| Sulfur content | (% wt/wt) | <0.5 |
| Density @ 15° C. | (kg/m$^3$) | <860 |
| Viscosity @ 40° C. | (mm$^2$/s) | <4.5 |
| T95 | (° C.) | <370 |
| Flash point | (° C.) | >52 |

The water phase for use in forming emulsions in accordance with the present invention can suitably be from any acceptable water source, and is preferably a water which is available in sufficient quantities, preferably in close proximity to the location where emulsions are to be formed, and preferably at an inexpensive cost. For example, a suitable water phase could be water such as 310 ppm brine. Of course, any other water from a suitable source and having various acceptable characteristics for the end emulsion, such as use as a component of a combustible fuel, would be acceptable.

In accordance with the invention, a surfactant package is provided which advantageously allows for formation of a stable microemulsion of water-in-hydrocarbon, with surprisingly small amounts of surfactant.

According to the invention, the surfactant package preferably includes a fatty acid component and a fatty acid salt component, as well as an alcohol component and a salt of a carboxylic acid.

The fatty acid and fatty acid salt components may advantageously be provided as a tallow fatty acid which is partially neutralized with alkaline compounds such as water soluble amines. The partial neutralization using water soluble amines leaves a portion of the initial fatty acid component and the neutralized component which forms the fatty acid salt component as desired.

Suitable tallow fatty acids include blends of $C_{16}$-$C_{22}$ molecules, and suitable water soluble amines for use in partial neutralization of the tallow fatty acids include monoethanolamine, ethylamine, diethylamine, triethylamine, n-propylamine, iso-propylamine, diethanolamine, triethanolamine, ethylenediamine, isopropanolamine, 2-amino-2-methyl 1-propanol and mixtures thereof.

Examples of particularly suitable fatty acids from which components of the surfactant package can be prepared or obtained include those selected from the group consisting of neat oleic acid, neat linoleic acid and mixtures thereof.

While the fatty acid and fatty acid salt components identified above can be used to obtain a stable microemulsion, it has advantageously been found in accordance with the present invention that the amount of surfactant needed can be substantially reduced through utilization of an additional component, which is the salt of carboxylic acid as identified above.

This organic salt can advantageously be formed from monocarboxylic or dicarboxylic acids preferably having between four and twelve carbon atoms in the carbon chain ($C_4$-$C_{12}$), for example those having $C_4$-$C_8$ and $C_4$-$C_{12}$ molecules, respectively. This acid is neutralized using water soluble amine so as to provide the desired carboxylic acid salt for the surfactant package in accordance with the present invention, and suitable water soluble amine for use in neutralizing the mono and dicarboxylic acid includes monoethanolamine, ethylamine, dithylamine, triethylamine, n-propylamine, iso-propylamine, diethanolamine, triethanolamine, ethylenediamine, isopropanolamine, 2-amino-2-methyl 1-propanol and mixtures thereof.

Examples of particularly suitable carboxylic acids include those selected from the group consisting of dodecanodioic acid, dodecanoic acid, hexanodioic acid, hexanoic acid, pentanoic acid, pentanodioic acid, isobutiric acid, isobutanodioic acid, octanodioic acid, octanoic acid, nonadioic acid, nonaioic acid heptanodioic acid, heptanoic acid, decanodioic acid, decanoic acid and combinations thereof.

This component can be prepared by dissolving the carboxylic acid into water along with the selected water soluble amine so as to neutralize the acid and provide the desired carboxylic acid salt. This water can be the water phase of the emulsion, or a portion thereof.

The surfactant package of the present invention is preferably provided including fatty acid component and fatty acid salt component combined in an amount between about 3.0 and about 5.5% vol based upon volume of the final emulsion. The water soluble amine is preferably between about 0.4 and about 1.2% vol based upon the emulsion.

The surfactant package in accordance with the present invention further preferably includes the carboxylic acid salt in an amount between about 0.1 and about 1.2% vol based upon the final emulsion.

In accordance with the present invention, the surfactant package has been found, advantageously, to allow for water-in-hydrocarbon emulsions wherein the ratio, by volume, of water to surfactant package is at least about 3 and, advantageously, between about 3 and about 4.3.

This type of surfactant package can advantageously be utilized to stabilize a microemulsion of water-in-hydrocarbon wherein the water phase is present in an amount between about 5 and about 20% vol based upon the final emulsion. It should readily be appreciated that for a microemulsion containing 20% vol water this results in a ratio of water to surfactant package which is greater than about 3, and which is desirable in light of reduction in cost of surfactant package and reduction in impact of surfactant component materials upon the final characteristics of the emulsion.

Within the surfactant package itself, the fatty acid and fatty acid salt components are preferably present in a ratio by vol to the salt of carboxylic acid component of between about 3.33 and about 20.

As will be demonstrated in the examples to follow, the surfactant package in accordance with the present invention provides substantially improved results as compared to a surfactant package including only the fatty acid and fatty salt components. Under these circumstances, the present invention allows for a reduction in fatty acid required for formation of the microemulsion by about 55%.

It is believed that the surfactant package in accordance of the present invention allows for such a substantial reduction in acid needed through a synergistic effect between the partially neutralized fatty acid and the carboxylate ions of the salt of carboxylic acid.

FIG. 1 shows interfacial tension as a function of concentration for a fatty acid (TOFA) and fatty acid salt (salt of TOFA) mixture, for the carboxylic acid salt alone, and for the combination which provides a surfactant package in accordance with the present invention.

As shown, the carboxylic acid salt component has a relatively high interfacial tension for the entire range of concentrations evaluated.

Also as shown, there is a range of concentration of the TOFA/salt of TOFA mixture which provides a desirably reduced interfacial tension.

It is clear, however, that the combination of these components provides substantially improved interfacial tension characteristics, including spontaneous emulsification at very low concentrations. This is desirable from the standpoint of reduced cost for surfactant as well as reduced quantities of surfactant which can affect qualities of the final emulsion product.

In further accordance with the invention, and as set forth above, emulsions are prepared including in the surfactant package and/or emulsion a water soluble and/or partially water soluble alcohol, specific preferred examples of which include $C_4$-$C_8$ alcohols such as n-butanol, iso-butanol, ter-butanol, n-pentanol, n-hexanol, 2-ethyl hexanol and combinations thereof. The alcohol component serves to improve qualities of the microemulsion as desired. For example, the additional components identified above can act as cosolvents which can allow for preparation of a more stable microemulsion.

In further accordance with the invention, examples of suitable fatty acids for use as the fatty acid component of the present surfactant package include neat oleic acid, neat linoleic acid and mixtures thereof.

The fatty acid salt component can advantageously be a salt formed from such fatty acids, preferably using a water soluble amine such as those identified above. These water soluble amines can be used to partially neutralize the fatty acid component so as to provide both the fatty acid component and fatty acid salt component as desired.

As set forth in co-pending U.S. patent application Ser. No. 09/565,556, this combination of surfactant components can provide for a stable microemulsion through provision of surfactant package components having different HLB values.

The emulsion and surfactant package for use in forming same can advantageously be used to provide an alternative fuel which is advantageously thermodynamically stable over a wide range of storage and handling conditions, and which is visually transparent. This emulsion as a fuel also shows great potential for reducing undesirable exhaust emissions.

The microemulsion of the present invention can be prepared using the process as described in co-pending U.S. patent application Ser. No. 09/565,556, and/or as described below.

Suitable supplies of both water phase and hydrocarbon phase are obtained.

The process can be started with the formation of a coarse dispersion of the water and hydrocarbon phases, which is refined and homogenized by turbulence-length scales of decreasing size (through mixing mechanisms associated with turbulent diffusion). The final stage of mixing involves microscale engulfment and stretching where the ultra low surface tension results in the formation of a microemulsion. Where no ultra-low interfacial tension is achieved, the fineness of the dispersion, for a given surfactant package, depends upon the intensity of the turbulence.

In order to form a suitable microemulsion, the water phase, hydrocarbon phase and surfactant package are preferably combined in the desired volumes and subjected to a mixing intensity (W/kg) which can be selected to provide the desired type of emulsion. In accordance with the invention, to form a microemulsion, it may be desirable to utilize a mixing intensity of between about 1 W/kg and about 10,000 W/kg. On an in-line production scale, the mixing intensity is more preferably between about 100 and about 1000 W/kg. If production rates are not critical, average mixing intensities between about 1 W/kg and about 100 W/kg also provide a stable microemulsion. Mixing according to the invention advantageously results in a desirable stable microemulsion having an average droplet size of between about 100 Å and about 700 Å. Emulsions formed according to the invention are advantageously stable in that the emulsion will retain an average droplet diameter, when stored under normal ambient conditions, for at least about 1 year and typically for an indefinite period of time.

The mixing intensity referred to herein is presented as average mixing intensity, averaged over the mixing profile of a vessel. Depending upon the mixing intensity and mixing time used, different orders of mixing intensity can be encountered within the mixing vessel. For example, mixing can be accomplished in accordance with the present invention utilizing a Rushton impulsor coupled to a Heidolph motor for providing the desired mechanical energy dissipation rate or mixing intensity. In a typical vessel mixed with this equipment, while the vessel may be mixed having an average energy dissipation rate of about 1 W/kg, the mixing intensity in close proximity to the mixing apparatus can in actuality be closer to the order of 100 W/kg. Mixing under such conditions will be referred to herein as mixing at an average mixing intensity of about 1 W/kg, or in the alternative, as 1-100 W/kg.

With other equipment, such as a rotor-stator mixer, the mixing intensity can be made nearly uniform.

It should also be noted that the mixing intensity as referred to herein relates to the energy dissipation rate as measured in power dissipated per unit mass of liquid in the mixer. The flow is assumed to be turbulent.

Suitable mixing equipment is readily available to the person of ordinary skill in the art. Examples of suitable mixing equipment are set forth above and in the examples to follow.

It should also be noted that various additional additives can be incorporated into the emulsion depending upon desired characteristics and intended use of the final emulsion product.

The following examples demonstrate the advantageous formation of stable microemulsions using surfactant packages in accordance with the present invention, with substantially reduced amounts of surfactants.

Example 1

The effect of the concentration of tallow fatty acid (TOFA) on the formation of a water in Diesel microemulsion containing 15% v/v water is shown in this example. Different surfactant components and combinations were used to form emulsions, and Table 2 below sets forth results obtained using various different surfactant components and packages.

TABLE 2

| Sample No. | Vol % Diesel | Surfactant | Vol % Surfactant | Vol % Monoethanol amine (MEA) | Vol % Hexanol | Observation |
|---|---|---|---|---|---|---|
| 1 | 69.8 | Tallow fatty acid (TOFA) salt of TOFA | 11.0 | 1.2 | 2 | Base microemulsion |
| 2 | (76.5-75.8) | Tallow fatty acid (TOFA)/amine salt of TOFA | 5.0 | (0.5-1.2) | 2 | Macroemulsion water in oil unstable |
| 3 | (79.6-72 ) | Amine salt of dodecanodioic acid | 1.2 | (0.5-1.2) | 2 | Water with oil are not blend |
| 4 | (75.3-74.6) | Tallow fatty acid (TOFA)/amine salt of TOFA/amine salt of dodecanodioic acid | 5/1.2 | (0.65-0.75) | 2 | Microemulsion water in oil |

As shown, at least 11% v/v of TOFA alone is required for obtaining a transparent microemulsion. This example further shows that the presence of an amine salt of dodecanodioic acid reduced the concentration of the tallow fatty acid required to produce the microemulsion to 5% v/v. The amine salt of dodecanodioic acid by itself was not able to produce the microemulsion.

Sample No. 1 was prepared using only the tallow fatty acid/amine salt of tallow fatty acid mixtures, and 11% surfactant was required in order to form a stable microemulsion.

Sample 2 was prepared using only 5% of the same surfactant package as used for Sample No. 1, and an unstable macroemulsion resulted.

Sample No. 3 was prepared using 1.2% of amine salt of dodecanodioic acid, and no emulsion at all was formed.

Finally, Sample No. 4 was prepared using the 5% of tallow fatty acid/salt of tallow fatty acid mixture along with 1.2% of amine salt of dodecanodioic acid. As noted, a stable microemulsion of water in oil was provided. It should be noted that this in connection with an emulsion having 15% vol of water. Thus, the emulsion prepared using Sample No. 4 advantageously has a ratio of water to tallow fatty acid/amine salt of tallow fatty acid of 3.

It should also be noted that the results demonstrated above were obtained including hexanol in an amount of 2% vol as a cosolvent.

Example 2

In this example the amine dodecanodioic salt was used at different concentrations in the formation of microemulsions containing 15% v/v of water and 5% v/v of TOFA. Results are shown in Table 3 below.

TABLE 3

| Sample No. | Vol % Diesel | Vol % Surfactant Tallow fatty acid (TOFA) | Vol % Amine salt of dodecanodioic acid | Vol % Monoethanol amine (MEA) | Vol % n-hexanol | Observation |
|---|---|---|---|---|---|---|
| 1 | (75.3-75.2) | 5 | 1 | (0.70-0.80) | 2 | Microemulsion water in oil |
| 2 | (75.5-75.4) | | 0.8 | (0.70-0.80) | | Microemulsion water in oil |
| 3 | (75.65-75.60) | | 0.6 | (0.8-0.9) | | Microemulsion water in oil stable |
| 4 | (75.7-75.6) | | 0.5 | (0.8-0.9) | | Microemulsion water in oil Stable |
| 5 | (75.4-75.2) | | 0.4 | (0.7-0.9) | 2.5 | Microemulsion water in oil stable |

As shown, even at values of 0.4% v/v of the amine dodecanodioic salt, microemulsion formation is obtained.

Example 3

This example shows that by keeping the amine dodecanodioic salt concentration at 0.4% (v/v), a microemulsion containing 15% (v/v) water can be formed with a TOFA concentration as low as 3.0% (v/v). Results are shown in Table 4 below.

TABLE 4

| Sample No. | Vol % Diesel | Vol % Surfactant TOFA | Vol % amine salt of dodecanodioic acid | Vol % Monoethanol amine (MEA) | Vol % hexanol | Observation |
|---|---|---|---|---|---|---|
| 1 | 76.3 | 4.0 | 0.4 | 0.80-0.90 | 2.5 | Microemulsion water in oil |
| 2 | 76.8 | 3.5 | | | | |
| 3 | 77.3 | 3.0 | | | | |

Example 4

This example shows combination of appropriate concentrations of TOFA and amine hexanodioic acid salt to prepare microemulsions with water concentrations ranging between 5 and 20% (v/v). Results are shown in Table 5 below.

TABLE 5

| Sample No. | Vol % Diesel | Vol % Surfactant TOFA/amine salt of hexanodioic acid | Vol % Monoethanolamine (MEA) | Vol % 2-ethyl-hexanol | Vol % water | Observation |
|---|---|---|---|---|---|---|
| 1 | (91.5-91.4) | 1.5/0.1 | 0.40-0.50 | 1.5 | 5 | Microemulsion water in oil |
| 2 | (83.1-81.9) | 3.0/0.2 | 0.70-0.90 | 3 | 10 | Microemulsion water in oil |
| 3 | (70.8-70.5) | 5/0.3 | 0.9-1.20 | 3 | 20 | Microemulsion water in oil |

Example 5

This Example shows that the microemulsion from Example 4 (sample 1) can be formed using 2 ethyl-hexanol instead of hexanol. Results are shown in Table 6 below.

TABLE 6

| Sample No. | Vol % Diesel | Vol % Surfactant tallow fatty acid (TOFA) | Vol % amine salt of dodecanodioic acid | Vol % Monoethanol amine | Vol % 2-ethyl-hexanol | Observation |
|---|---|---|---|---|---|---|
| 1 | (78.5-76.7) | 4 | 0.4 | (0.60-0.90) | 1.5-3.0 | Microemulsion water in oil |

Example 6

This example shows that the microemulsion from Example 5 (Sample 1) can be formed using 0.4% (v/v) of amine salts of different carboxylic acids. Table 7 shows the results obtained.

TABLE 7

| Sample No. | Vol % Diesel | Surfactant | Vol % Surfactant | Vol % MEA | Vol % 2-ethyl-hexanol | Observation |
|---|---|---|---|---|---|---|
| 1 | (78.5-76.4) | TOFA/amine salt of hexanodioic Acid | 4/0.4 | (0.6-1.2) | 1.5-3.0 | Microemulsion |
| 2 | (78.5-76.8) | TOFA/amine salt of hexanoic acid | 4.5/0.4 | (0.6-0.75) | | |
| 3 | (78.5-76.7) | TOFA/amine salt pentanoic acid | 4.5/0.4 | (0.6-0.9) | | |
| 4 | (78.5-76.6) | TOFA/amine salt of isobutiric acid | 5/0.4 | (0.6-1.0) | | |
| 5 | (78.5-76.4) | TOFA/amine salt of octanodioic acid | 4/0.4 | (0.6-1.2) | | |
| 6 | (75.7-75.4) | TOFA/amine salt of nonadioic acid | 4/0.4 | (0.9-1.2) | | |

It should be appreciated that a surfactant package and water-in-hydrocarbon emulsion including same have been provided which exhibit advantageous characteristics in terms of stability, reduced surfactant quantities, and desirable characteristics of the final product.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed:

1. A surfactant package for a water-in-hydrocarbon emulsion, comprising:
   a fatty acid component selected from the group consisting of neat oleic acid, neat linoleic acid and mixtures thereof;
   a fatty acid salt component comprising a salt of $C_{16}$-$C_{22}$ molecules, wherein said fatty acid salt component comprises a salt of a fatty acid and a water soluble amine;
   an alcohol component; and
   a salt of carboxylic acid, wherein said salt of carboxylic acid comprises a salt of $C_4$-$C_{12}$ molecules and is a salt of dodecanodioic acid, hexanodioic acid and combinations thereof, and wherein said fatty acid component and said fatty acid salt component are present in a ratio by volume to said salt of carboxylic acid of between about 3.33 and about 20.

2. The surfactant package of claim 1, wherein said water soluble amine is selected from the group consisting of monoethanolamine, ethylamine, diethylamine, triethylamine, n-propylamine, iso-propyl amine, diethanolamine, triethanolamine, ethylenediamine, isopropanolamine, 2-amino-2-methyl 1-propanol and mixtures thereof.

3. The surfactant package of claim 1, wherein said salt of said carboxylic acid is a salt of water soluble amine and said carboxylic acid.

4. The surfactant package of claim 3, wherein said water soluble amine is selected from the group consisting of monoethanolamine, ethylamine, diethylamine, triethylamine, n-propylamine, iso-propyl amine, diethanolamine, triethanolamine, ethylenediamine, isopropanolamine, 2-amino-2-methyl 1-propanol and mixtures thereof.

5. The surfactant package of claim 1, wherein said salt of carboxylic acid comprises carboxylate ions.

6. The surfactant package of claim 1, wherein said alcohol component comprises C4-C8 alcohols.

7. A water-in-hydrocarbon emulsion, comprising a water phase; a hydrocarbon phase; and a surfactant package, wherein said surfactant package comprises:
   a fatty acid component selected from the group consisting of neat oleic acid, neat linoleic acid and mixtures thereof;
   a fatty acid salt component comprising a salt of $C_{16}$-$C_{22}$ molecules, wherein said fatty acid salt component comprises a salt of a fatty acid and a water soluble amine;
   an alcohol component; and
   a salt of carboxylic acid, wherein said salt of carboxylic acid comprises a salt of $C_4$-$C_{12}$ molecules and is a salt of dodecanodioic acid, hexanodioic acid, and combinations thereof, wherein said fatty acid component and said fatty acid salt component are present in a ratio by volume to said salt of carboxylic acid of between about 3.33 and about 20, and wherein said emulsion contains said water phase in an amount between about 5% vol and about 20% vol based upon volume of said emulsion.

8. The emulsion of claim 7, wherein said water soluble amine is selected from the group consisting of monoethanolamine, ethylamine, diethylamine, triethylamine, n-propylamine, iso-propyl amine, diethanolamine, triethanolamine, ethylenediamine, isopropanolamine, 2-amino-2-methyl 1-propanol and mixtures thereof.

9. The emulsion of claim 7, wherein said salt of said carboxylic acid is a salt of water soluble amine and said carboxylic acid.

10. The emulsion of claim 9, wherein said water soluble amine is selected from the group consisting of monoethanolamine, ethylamine, diethylamine, triethylamine, n-propylamine, iso-propyl amine, diethanolamine, triethanolamine, ethylenediamine, isopropanolamine, 2-amino-2-methyl 1-propanol and mixtures thereof.

11. The emulsion of claim 7, wherein said salt of carboxylic acid comprises carboxylate ions.

12. The emulsion of claim 7, wherein said fatty acid component and said fatty acid salt component are present in an amount between about 3.0% vol and about 5.5% vol based upon volume of said emulsion.

13. The emulsion of claim 12, wherein said salt of said carboxylic acid is present in an amount between about 0.1% vol and about 1.2% vol based upon volume of said emulsion.

14. The emulsion of claim 13, wherein said emulsion has a ratio by volume of said water phase to said surfactant package of at least about 3.0.

15. The emulsion of claim 7, wherein said alcohol component comprises C4-C8 alcohol.

16. The emulsion of claim 7, wherein said hydrocarbon phase is Diesel fuel.

17. The emulsion of claim 7, wherein said emulsion is a stable microemulsion.

18. The surfactant package of claim 1, wherein the salt of carboxylic acid is a water soluble amine salt of dodecanodioic acid or hexanodioic acid.

19. The emulsion of claim 7, wherein the salt of carboxylic acid is a water soluble amine salt of dodecanodioic acid or hexanodioic acid.

* * * * *